May 8, 1945.  R. W. DOCTEUR  2,375,290
FISHING SPOON
Filed Nov. 20, 1943

INVENTOR.
Russell W. Docteur
BY Harold E. Stonebraker
his Attorney

Patented May 8, 1945

2,375,290

UNITED STATES PATENT OFFICE 2,375,290

FISHING SPOON

Russell W. Docteur, Rochester, N. Y.

Application November 20, 1943, Serial No. 511,064

10 Claims. (Cl. 43—42)

This invention relates to a fishing spoon, and has for its object to afford a metal structure that can be manufactured at low cost and which simulates the movement of a small fish when drawn slowly through the water.

More particularly, the invention has for its purpose to afford a fishing spoon that can be readily produced from a flat metal blank and which maintains a position slightly below the surface of the water when drawn along, while presenting a maximum expanse of brilliant, reflective surfaces in all directions and having considerable back and forth motion in a horizontal plane.

Another object of the invention is to provide a spoon that can be manufactured from extremely light gauge metal so as to afford a combination of minimum weight with maximum metal reflecting surfaces and in which the hooks and line are attached in such a fashion as to relieve the metal body of the spoon from any strain or tension when pull is exerted on the line.

A further purpose of the invention is to afford a spoon of simple construction formed of light weight stock in such a way as to provide sufficient stability, while protecting the spoon against strains resulting from pulls on the line, thus making possible a larger spoon with greater reflecting surfaces than can be had with a spoon made of heavier gauge metal where the hooks and line are attached directly to the spoon.

Another object is to provide a spoon of such shape that it will maintain a more or less stable position slightly below the surface of the water, and remain balanced in a generally horizontal position, subject only to an oscillating motion as it travels along.

To these and other ends, the invention consists in the construction and arrangement that will appear more clearly from the following description when read in conjunction with the accompanying drawing, the novel features being pointed out in the claims following the specification.

Figure 6:
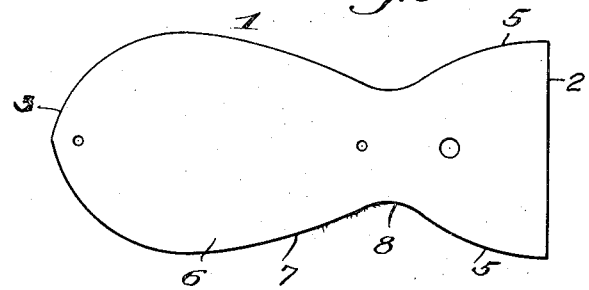
Fig. 6 is a plan view of a metal blank from which the spoon can be formed.

Referring more particularly to the drawing in which like reference numerals refer to the same parts throughout the several views, the spoon is preferably made from a thin metal blank 1 of very light gauge stock, preferably about $\frac{1}{32}$" in thickness, and having the shape shown in Fig. 6, including a straight front edge 2 and a curved rear edge 3 with reversely curved side edges that will be referred to in more detail presently. The blank 1 is initially bent along a longitudinal central axis to produce a generally concave cross-section and thereafter bent along a transverse axis located at approximately the narrowest portion of the blank, to produce the angularly related forward and rear portions of the spoon, arranged at an angle of something more than ninety degrees to each other.

Figure 4:
Fig. 4 is a detail sectional view on the line 4—4 of Fig. 1.

Such last mentioned bending of the blank 1 results in the forward portion 4 that is shaped to produce a sharply concaved cross-section as appears in Fig. 4, being widest at its front end and narrowest at its back end with tapering side edges 5 connecting the front and back ends.

Figure 5:
Fig. 5 is a detail sectional view on the line 5—5 of Fig. 1.

The forward portion 4 is relatively short, occupying approximately one-third the total length of the spoon, while the remaining two-thirds constitutes a relatively long rear portion 6 that is of shallow V-shaped or concave cross-section, as appears in Fig. 5, in order to impart stability to the rear portion and to prevent rotation or spinning of the spoon.

Figure 1:
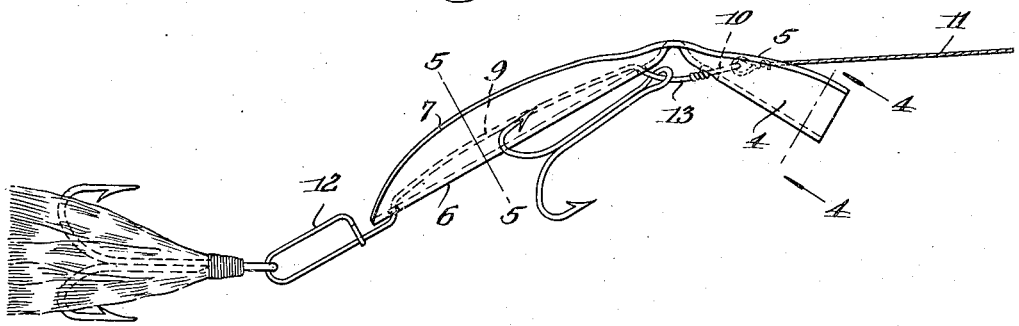
Fig. 1 is a view in side elevation showing a fishing spoon constructed in accordance with a preferred embodiment of the invention.
Figure 2:
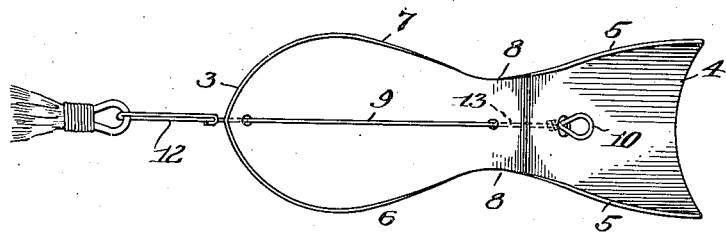
Fig. 2 is a plan view of the same.
Figure 3:
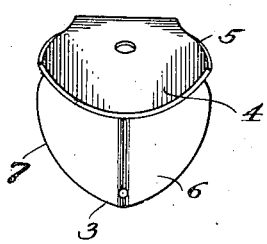
Fig. 3 is an end elevation looking from right to left of Fig. 2.

The rear portion 6 is widest near its center and includes reversely curved side edges 7 that taper in both directions toward the ends of the rear portion 6, the back end being curved at 3 while the front end of the rear portion 6 is connected to the forward portion 4 by means of a narrow convex wall 8 located between them, as appears clearly in Figs. 1 and 2.

The structure has been described above with the spoon assumed to be in the position which it normally occupies when being drawn through the water slowly, the forward and rear portions 4 and 6 both being inclined downwardly to the horizontal with an angle of somewhat more than ninety degrees between them.

The length and weight of the rear portion 6 acts to maintain the forward portion in a more or less stable or steady position and prevents the spoon from diving, rotating, or spinning, while the sharp concavity of the forward portion 4 effects a scoop-like action on the water.

The forward and rear portions 4 and 6 with their concave or V-shaped cross-sections and having the angular relation to each other as indicated above, present wide, brilliant, reflecting surfaces in all directions and thus are highly attractive to the fish due to the relatively large exposed shiny area of the metal spoon which is chromium plated or otherwise provided with a brilliant, reflecting exterior surface. This is made possible by the use of very light stock, since if a spoon of the same size were made from heavier stock, its weight would be so great as to have a tendency to sink and prevent its moving just under the surface of the water.

The stock from which the spoon is formed is sufficiently thin as to be easily bent out of shape if undue pressure is applied, and to overcome this and resulting damage to the spoon, it is necessary to connect the line and hooks in such manner that no strain is exerted at any time directly on the metal spoon by reason of pulls on the line, and this is accomplished in the following manner.

9 designates a line and hook connecting member formed of stiff, heavy wire suitable for the purpose and terminating at its front end in an eye 10 to which the line 11 may be connected in any suitable fashion. The line connecting wire 9 extends from eye 10 through an opening in the forward portion 4 to the underside of the spoon, thence through an opening in the front end of the rear portion 6 to the upper side of the spoon whence it extends along the bottom of the V-shaped depression in the rear portion 6 and through an opening at the back end of said rear portion to the underside of the spoon, terminating in the detaching loop 12 to which a hook may be suitably connected, while 13 designates an intermediate portion of the wire 9 located on the underside of the spoon between the forward and rear portions and to which a hook may also be connected, as shown in Figs. 1 and 4.

When the line and hook attaching wire 9 is threaded through the openings in the spoon in the manner shown, it is firmly and securely held on the spoon against rotation or other relative movement, and when a pull is exerted on the line by a fish taking hold of either hook, the strain is exerted principally on the wire member 9 and there is no direct pull on any one part of the spoon which would have a tendency to bend or twist the latter out of shape. The wire member 9 is secured to the spoon in such a way that any pull exerted on it is divided over different portions of the spoon and no one area is directly affected. In this manner, there is insufficient pull exerted on any portion of the spoon to distort its shape and practically the entire strain of any pull on a hook is taken by the line and the wire member 9 which is fixedly mounted on the spoon.

While the invention has been described with reference to the particular construction herein disclosed, it is not confined to the details shown, and this application is intended to cover any such modifications or departures as many perform the described functions and come within the purposes of the invention and the scope of the following claims.

I claim:

1. A fishing spoon including a downwardly inclined sharply concaved forward portion, and a downwardly inclined rear portion of V-shaped cross-section connected to said forward portion by a narrow convex wall, said forward portion constituting approximately one-third of the total length of the spoon and having a front edge wider than the narrow convex wall, with all points in the front edge in a plane at a right angle to the longitudinal axis of the forward portion.

2. A fishing spoon including a downwardly inclined sharply concaved forward portion and a downwardly inclined rear portion of V-shaped cross-section having a wide central area with side edges tapering toward both ends and connected to said forward portion by a narrow convex wall said forward portion constituting approximately one-third of the total length of the spoon and having a front edge wider than the narrow convex wall, with all points in the front edge in a plane at a right angle to the longitudinal axis of the forward portion.

3. A fishing spoon including a downwardly inclined sharply concaved forward portion having a wide front end and a narrow rear end connected to the front end by tapering side edges, and a downwardly inclined rear portion of V-shaped cross-section and having a wide central area with side edges tapering toward both ends and connected to said forward portion by a narrow convex wall said forward portion constituting approximately one-third of the total length of the spoon and having a front edge wider than the narrow convex wall, with all points in the front edge in a plane at a right angle to the longitudinal axis of the forward portion.

4. A fishing spoon including a relatively short downwardly inclined sharply concaved forward portion having a wide front end and a narrow rear end connected to the front end by tapering side edges, and a relatively long downwardly inclined rear portion forming an angle somewhat more than a right angle to said forward portion, said rear portion being of V-shaped cross-section and having a wide central area with side edges tapering toward both ends and connected to said forward portion by a narrow convex wall, said forward portion constituting approximately one-third of the total length of the spoon and having a front edge wider than the narrow convex wall, with all points in the front edge in a plane at a right angle to the longitudinal axis of the forward portion.

5. A fishing spoon including a relatively short downwardly inclined sharply concaved forward portion having a wide front end with all points in the front edge in a plane at a right angle to the longitudinal axis of the forward portion and a narrow rear end connected to the front end by tapering side edges, and a relatively long downwardly inclined rear portion forming an angle somewhat more than a right angle to said forward portion, said rear portion being of shallow V-shaped cross-section and having a wide central area with side edges tapering toward both ends, terminating in a curved edge at the back end and connected to said forward portion by a narrow convex wall, said forward portion occupying approximately one-third the total length of the spoon.

6. A fishing spoon including a downwardly inclined sharply concaved forward portion and a downwardly inclined rear portion of V-shaped cross-section having a wide central area with side edges tapering toward both ends and connected to said forward portion by a narrow convex wall, and a line and hook attaching wire extending from said forward portion through an opening therein and through openings at opposite ends of said rear portion, said wire being secured to the spoon against relative movement and acting to relieve the spoon from strain resulting from pull on the line.

7. A fishing spoon including a downwardly inclined sharply concaved forward portion having a wide front end and a narrow rear end connected to the front end by tapering side edges, a downwardly inclined near portion of V-shaped cross-section and having a wide central area with side edges tapering toward both ends and connected to said forward portion by a narrow convex wall and a line and hook attaching wire extending from said forward portion through an opening therein and through openings at opposite ends of said rear portion, said wire being secured to the spoon against relative movement and acting to relieve the spoon from strain resulting from pull on the line.

8. A fishing spoon including a relatively short downwardly inclined sharply concaved forward portion having a wide front end and a narrow rear end connected to the front end by tapering side edges, a relatively long downwardly inclined rear portion forming an angle somewhat more than a right angle to said forward portion, said rear portion being of V-shaped cross-section and having a wide central area with side edges tapering toward both ends and connected to said forward portion by a narrow convex wall, and a line and hook attaching wire extending from said forward portion through an opening therein and through openings at opposite ends of said rear portion, said wire being secured to the spoon against relative movement and acting to relieve the spoon from strain resulting from pull on the line.

9. A fishing spoon including a relatively short downwardly inclined sharply concaved forward portion having a wide front end with all points in the front edge in a plane at a right angle to the longitudinal axis of the forward portion and a narrow rear end connected to the front end by tapering side edges, a relatively long downwardly inclined rear portion forming an angle somewhat more than a right angle to said forward portion, said rear portion being of shallow V-shaped cross-section and having a wide central area with side edges tapering toward both ends, terminating in a curved edge at the back end and connected to said forward portion by a narrow convex wall, and a line and hook attaching wire extending from said forward portion through an opening therein and through openings at opposite ends of said rear portion, said wire being secured to the spoon against relative movement and acting to relieve the spoon from strain resulting from pull on the line.

10. A fishing spoon including a downwardly inclined sharply concaved forward portion, a downwardly inclined rear portion of V-shaped cross-section connected to said forward portion by a narrow convex wall, and a line and hook attaching wire extending from said forward portion through an opening therein and through openings at opposite ends of said rear portion, said wire being secured to the spoon against relative movement and acting to relieve the spoon from strain resulting from pull on the line.

RUSSELL W. DOCTEUR.